(No Model.) 4 Sheets—Sheet 1.

W. LOWRIE, C. J. HALL & H. W. KOLLE.
METHOD OF AND APPARATUS FOR MEASURING ALTERNATING CURRENTS OF ELECTRICITY.

No. 424,891. Patented Apr. 1, 1890.

Attest:
S. H. Knight
E. Arthur

Inventors
Wm. Lowrie
Chas. J. Hall
Harold W. Kolle
By Knight Bros
Attys.

(No Model.) 4 Sheets—Sheet 2.

W. LOWRIE, C. J. HALL & H. W. KOLLE.
METHOD OF AND APPARATUS FOR MEASURING ALTERNATING CURRENTS OF ELECTRICITY.

No. 424,891. Patented Apr. 1, 1890.

Attest:
S. H. Knight
E. Arthur

Inventors:
Wm. Lowrie
Chas. J. Hall
Harold W. Kolle
By Knight Bros
Attys.

(No Model.) 4 Sheets—Sheet 3.
W. LOWRIE, C. J. HALL & H. W. KOLLE.
METHOD OF AND APPARATUS FOR MEASURING ALTERNATING CURRENTS OF ELECTRICITY.

No. 424,891. Patented Apr. 1, 1890.

(No Model.) 4 Sheets—Sheet 4.
W. LOWRIE, C. J. HALL & H. W. KOLLE.
METHOD OF AND APPARATUS FOR MEASURING ALTERNATING
CURRENTS OF ELECTRICITY.

No. 424,891. Patented Apr. 1, 1890.

UNITED STATES PATENT OFFICE.

WILLIAM LOWRIE, CHARLES JAMES HALL, AND HAROLD WERNER KOLLE, OF LONDON, COUNTY OF MIDDLESEX, ENGLAND.

METHOD OF AND APPARATUS FOR MEASURING ALTERNATING CURRENTS OF ELECTRICITY.

SPECIFICATION forming part of Letters Patent No. 424,891, dated April 1, 1890.

Application filed June 12, 1888. Serial No. 276,890. (No model.) Patented in England November 8, 1887, No. 15,217; in France June 28, 1888, No. 191,487; in Belgium June 28, 1888, No. 82,370, and in Italy December 31, 1888, XXII, 24,266/77.

*To all whom it may concern:*

Be it known that we, WILLIAM LOWRIE, engineer, CHARLES JAMES HALL, electrician, and HAROLD WERNER KOLLE, electrician, subjects of the Queen of Great Britain, and residents of London, in the county of Middlesex, England, have invented certain new and useful Improvements in Measuring Alternating Currents of Electricity, (for which we have obtained Letters Patent in Great Britain, No. 15,217, dated November 8, 1887; France, No. 191,487, dated June 28, 1888; Belgium, No. 82,370, dated June 28, 1888, and Italy, XXII, 24,266/77, dated December 31, 1888,) of which the following is a specification.

Our invention relates to a method of measuring alternating currents of electricity; and it consists in differentiating the wave of potential, so that there is a slight preponderance upon one side of the neutral line over the other. The difference of potential is available, and may be utilized for doing the work of measurement either by mechanical means or by chemical action. The differentiation may be produced by the introduction of a medium acting upon the pulsations of the main current in such a manner that the potential of the main current in one direction is slightly higher than the potential in the other direction, as by a retarding influence or resistance opposing the main current in one direction only, or by the introduction of a constant electro-motive force into the circuit, which, re-enforcing the potential wave of the main current in one direction, would retard it in the opposite direction. The differentiation can be effected by various means, and it may originate in the alternating-current-generating machine itself or in a device or devices outside of or exterior to the generating apparatus and acting upon the flow of the current. When produced by exterior means, the differentiation may be accomplished by a dynamo-machine, by a primary or secondary battery, or by other means having the desired result.

To illustrate our invention more clearly, we give an example of an apparatus for measuring alternating currents and operating in a manner above mentioned. Let it be required to measure the current duration of a number of lamps in a lighting-circuit. We place in the lamp-circuit a voltaic cell which comprises two dissimilar metals placed in an acid or alkaline solution. When an alternating current is passed through this cell and the lamp-circuit, the passage or flow of the current is alternately retarded or assisted by the normal electro-motive force set up in the cell itself, which normal current causes a wasting or loss of weight of the positive electrode. As the resistance of the lamps in the lamp-circuit varies according to the number and kind used and the duration of the flow of current through the same, so does the current vary in the cell which acts upon the positive electrode. This current is directly proportional to the electro-motive force of the cell and the resistance of the lamp-circuit. The action of the cell therefore becomes available as a current-measure.

Another method is to use a primary or a secondary battery in series with a deposition-cell and the lamp-circuit. The current then obtained from the action of the primary or secondary cell causes an electro-deposition of metal in the deposition-cell. The deposition-cell may be of any ordinary kind, a suitable one for the purpose being two copper plates in a solution of copper sulphate. The amount of metal lost or gained by the respective plates or electrodes thus becomes a measure of the number of ampère hours of current energy in the lamp-circuit.

When secondary generators or converters are used, the differentiation of the current may be produced in the secondary or in the primary circuit. If the differentiation is effected in the primary circuit, it is then reproduced in the secondary circuit by induction.

The diagrams shown by the figures in the accompanying drawings indicate several arrangements of our invention as adapted for use in both primary and secondary circuits. In these diagrams or figures, $a$ indicates the generator; $a'$, the main circuit; $a^2$, the secondary circuit; $b$, the lamps or other appliances in which electrical energy is expended; c, converter or secondary generator; d, depositing-cell, and e an electro-motive force.

Figure 1 is a diagram of a circuit arranged in parallel, with a constant electro-motive force e and a depositing-cell d placed in the circuit. The differential action of the current causes an electro-deposition of metal in the depositing-cell by the influence of the electro-motive force e on the alternating electro-motive force, which, being proportional to the amount of electricity passed through b, becomes a measure of the same.

Figure 5:
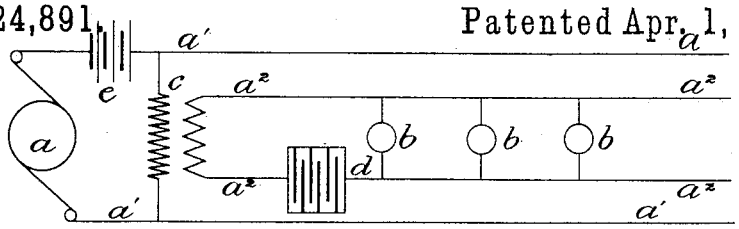

Fig. 5 is also a parallel converter-circuit arrangement. The electro-motive force e in this case is placed in the primary circuit $a'$, and the deposition-cell d is placed in the secondary circuit $a^2$. The differentiation of the electro-motive force produced by the constant electro-motive force e in the primary circuit $a'$ is reproduced by induction in the secondary circuit $a^2$ by means of the converter c, electro-deposition resulting in the depositing-cell d.

Figure 6:
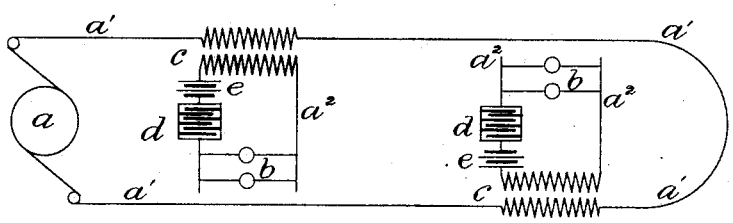

In Fig. 6 the diagram indicates several converters c c placed in series in the primary circuit $a'$, which induce current in several secondary circuits $a^2$ $a^2$ arranged in parallel. Both the electro-motive force e e and deposition-cells d d are placed in the said secondary circuits, and thus become a measure for the electricity passed, as described in relation to Fig. 1.

Figure 7:
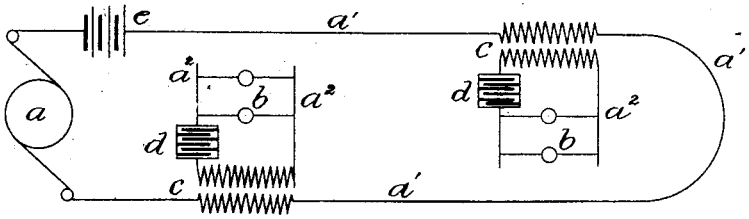

Fig. 7 is also a converter-series arrangement, but having the electro-motive force e in the primary circuit $a'$ and depositing-cells in the several secondary circuits $a^2$, the differentiation of the electro-motive force produced by e being reproduced in the secondary circuits by the converters c c, as in Fig. 5.

Figure 2:
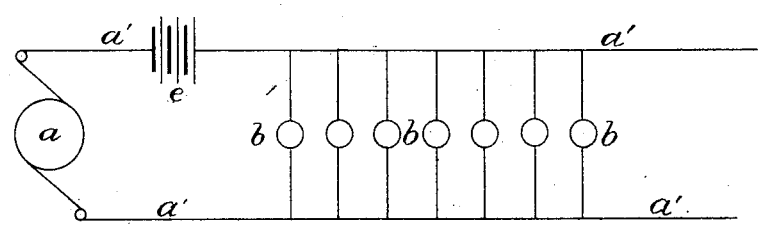
Fig. 2 is a diagram of a similar circuit, but without the deposition-cell. In this arrangement one of the electrodes of the constant electro-motive force e loses weight proportional to the electricity passed through b, and this loss becomes a measure of the same.
Figure 3:
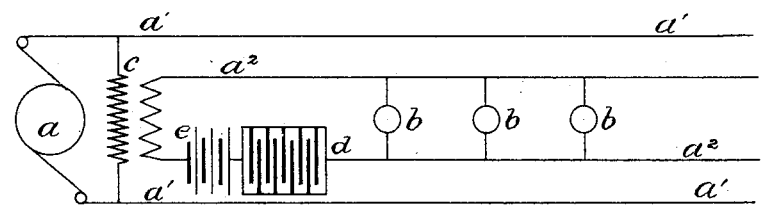
Fig. 3 is a diagram of a converter-circuit where both primary and secondary circuits are coupled in parallel, the primary circuit $a'$ inducing currents in a secondary circuit $a^2$ by means of a converter or secondary generator c. A depositing-cell d and a constant electro-motive force e are placed in the secondary circuit $a^2$, thus becoming a measure, as described in relation to Fig. 1.
Figure 4:
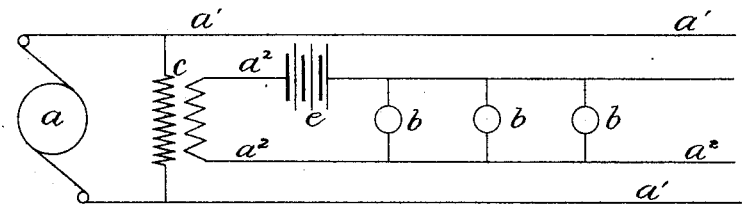
Fig. 4 is a diagram of a similar arrangement to that shown by Fig. 3, but without the deposition-cell. The electro-motive force e in the secondary circuit $a^2$ has one electrode losing weight, as explained in relation to Fig. 2.
Figure 8:
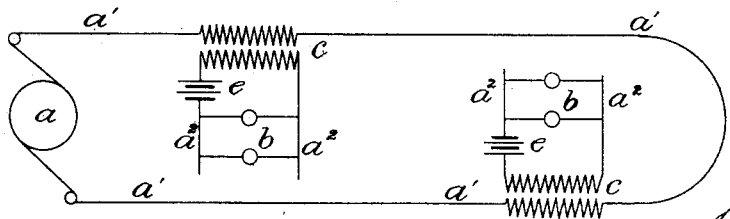

Fig. 8 is another converter-series arrangement, the constant electro-motive force e e being placed in the several secondary circuits $a^2$ $a^2$, one electrode losing weight, as explained in relation to Fig. 2.

Figure 9:
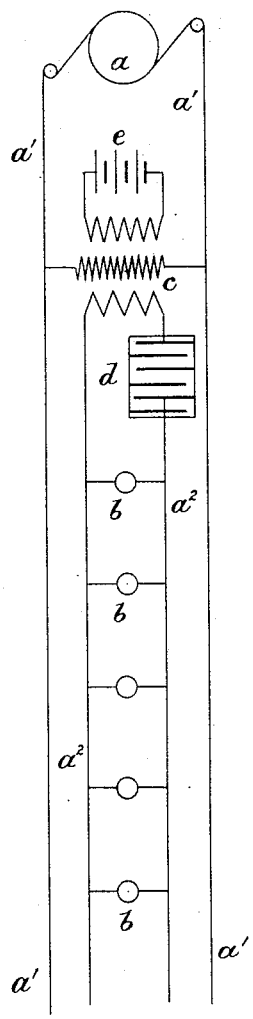

Fig. 9 is a parallel converter-circuit arrangement. The electro-motive force e in this case is used in a separate winding of the converter c. This in combination with the primary circuit $a'$ produces by induction a differentiated current in the secondary circuit $a^2$, electro-deposition resulting in the depositing-cell d, as shown in Fig. 5.

Figure 10:
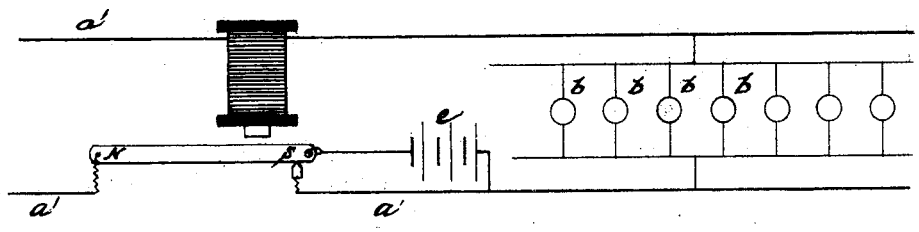

Fig. 10 represents an arrangement in which the electro-motive force e is intermittently brought into the circuit for re-enforcing the current in one direction. The permanently-magnetic armature N S is attracted when the current flows in one direction, thus breaking the direct circuit and permitting the current to flow through e, but is repelled when the current flows in the other direction, thereby closing the direct circuit and short-circuiting the electro-motive force e.

Figure 11:
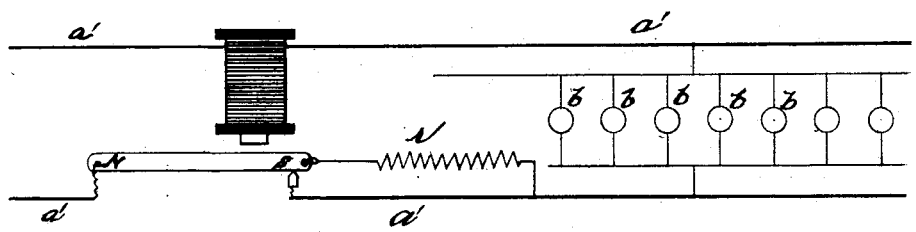

Fig. 11 represents an arrangement exactly similar to Fig. 10, excepting that the electro-motive force e is replaced by a resistance r. The differentiation is thus effected by resisting the current in one direction only.

It is to be understood that e may not only indicate a constant electro-motive force, (acting to re-enforce the potential wave of the main or alternating electro-motive force in one direction and to retard it in the opposite,) but also an equivalent to the above in cases where the description or arrangement does not otherwise conflict. For example, an intermittent electro-motive force acting upon the main or alternating electro-motive force to increase the potential in one direction or a resistance opposing the main or alternating electro-motive force in one direction may be considered equivalents. It is also to be understood that the depositing-cell d may be used in a shunt.

The method of utilizing the meter and of computing the quantity of electricity consumed will be understood from the following description. In this meter an alternating current of electricity is made to deposit copper as a measure of the amount of electric energy expended in the lamp-circuit. To do this we vary the effect of the current alternations in its opposite directions, as it is well known that alternating currents, in the ordinary manner, will not deposit metal. Therefore we increase the electro-motive force in one direction, and this causes a difference in the potential of the current, so that the alternations in the two directions are no longer equal, and this we call a "differential" or "differentiated" alternating current. Now, this difference enables the current to deposit a certain amount of copper in a depositing-cell, the amount deposited being in proportion to the difference of the electro-motive force in the two directions of the alternating current and the time during which the current is used for lighting. Suppose we place an accumulator (or secondary battery) having an electro-motive force of two volts in series with a deposition-cell in a lamp-circuit, supplied with an alternating current of one hundred volts from a dynamo or induction apparatus, and of ten ampères. Then, in the half alternation positive (+) to the accumulator at its highest point, we have total electro-motive force equals two hundred and two volts; therefore the maximum current $\frac{202}{10}=20.2$ ampères; while in the negative (−) half alternation we have, total resultant electro-motive force equals one hundred and ninety-eight volts; therefore the current $=\frac{198}{10}=19.8$ ampères. This gives us a current of .4 ampères for depositing the copper in the depositing-cell. But as this current of .4 ampères only acts for one-half the time, it is only equal to .2 for all the time, or, in other words, a current equal to two volts, constantly acting through the resistance of the lamp-circuit.

Figure 1:
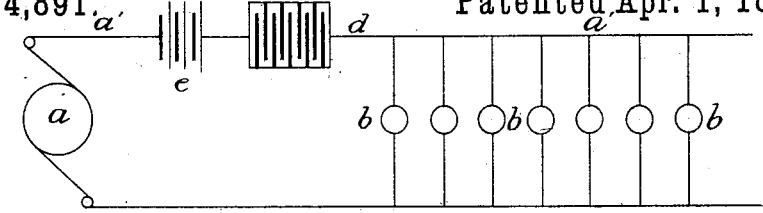

The lamp-circuit $a'$ in Fig. 1 is shown with seven lamps in the circuit, and, supposing these are one-hundred-volt lamps of sixty watts each, with a single accumulator $e$ in series with the lamp-circuit, then each unit (one thousand watt hours) will deposit .235 grams of copper, as by the example 1 (given below.) Suppose that some, or all, of the seven lamps in $e'$, Fig. 1, have been burning at intervals during three months. At the end of this time the negative (−) copper deposition-plate in the cell C, when weighed, may be found to have gained, say, twenty-five grams. Then, to find the number of units consumed, divide twenty-five grams by .235, (the constant for one unit, as by example 1,) and the result will be 106.38 units of electricity consumed in the lamp-circuit. For other than one hundred volts, the deposit will increase by the square in proportion to the reduction of the one hundred volts or decrease in the inverse ratio for higher pressures, the measuring capacity of the meter varying also by these proportions.

*The constant.*—To find the deposition constant for one unit of electricity at any voltage, divide the electro-motive force of the accumulator B by the lamp resistance for one hour and multiply by time and the electro-chemical equivalent. The result equals the deposit in grams.

Example 1. The lamp resistance for one unit at one hundred volts for one hour will be ten ohms, the electro-motive force of the accumulator two volts, and the electro-chemical equivalent will be .000,327.

$$\therefore \frac{2}{10}\times \overset{\text{sec.}}{60}\times \overset{\text{min.}}{60}\times .000,327 = .235 \text{ grams.}$$

Example 2. The lamp resistance for one unit at fifty volts for one hour will be 2.5 ohms.

$$\therefore \frac{2}{2.5}\times \overset{\text{sec.}}{60}\times \overset{\text{min.}}{60}\times .000,327 = .940 \text{ grams.}$$

Having now particularly described and ascertained the nature of our said invention, and in what manner the same is to be performed, we declare that what we claim is—

1. The method of measuring the quantity of an alternating current of electricity passing over a given circuit, which consists in differentiating the current in opposite directions and utilizing said differentiation to operate an electric meter, substantially in the manner set forth.

2. The method of measuring an alternating current of electricity, which consists in subjecting a meter to the action of the current and differentiating said current to overcome the neutralizing effect of the same.

3. The method of measuring an alternating current of electricity, which consists in differentiating the current in opposite directions by the influence of an additional source of electrical energy of known relation to the main source and utilizing said differentiation to operate a meter, substantially as set forth.

4. The method of measuring alternating currents of electricity, which consists in differentiating the current in opposite directions by a medium having a known relation to the main current and then passing the current in each direction through an electrometer, whereby the neutralizing effect is overcome and the meter allowed to register, substantially as set forth.

5. The method of measuring alternating currents of electricity, which consists in differentiating the current in opposite directions by a medium which opposes the current in one direction and re-enforces it in the other and then utilizing such differentiation to operate a meter, as set forth.

6. The method of measuring the amount of work done in an alternating-current circuit by means of a deposition-cell, which consists in differentiating the current by a medium of known capacity, so that metal will be deposited proportionally to the depositing capacity of the current in one direction, and then computing the actual work from such proportional deposit, substantially in the manner set forth.

7. The combination, with a source producing an alternating current of electricity, of a circuit for supplying the same to the translating devices, an electrometer having working communication with said circuit, and a differentiating medium, substantially as described, for overcoming the neutralizing effect on the electrometer of the opposite waves of the current, all substantially as set forth.

8. The combination, with an alternating-current circuit, of an electrometer and an additional source affecting the main current unequally in opposite directions, substantially as set forth.

9. The combination, with an alternating-current primary circuit, of a suitable converter, translating devices, a differentiating medium affecting the secondary current, and an electric meter having working connection with the differentiated-current circuit, all substantially as set forth.

10. In a meter for alternating currents, the combination, with the alternating-current source, the circuit, and translating devices, of an electro-deposition cell and an additional source of electricity, all substantially as set forth.

11. In a meter for alternating currents, the combination, with the alternating current circuit which supplies the electricity to be consumed, of an electric cell having metallic electrodes connected with said circuit, substantially as and for the purpose set forth.

12. The combination, with an alternating-current circuit for supplying electricity to be consumed, of an electrical source and an electric deposition-cell connected with said circuit, substantially as and for the purposes set forth.

13. The combination of an alternating-current circuit, one or more converters, secondary circuits supplied by the converters, and suitable differentiating and measuring media connected with the secondary circuit, all substantially as set forth.

In testimony whereof we have signed this specification in the presence of two subscribing witnesses.

WILLIAM LOWRIE.
CHARLES JAMES HALL.
HAROLD WERNER KOLLE.

Witnesses:
JASPER WETTER,
CHAS. ROCHE.